(12) United States Patent
Otobe et al.

(10) Patent No.: US 9,340,856 B2
(45) Date of Patent: May 17, 2016

(54) NI—FE—CR ALLOY AND ENGINE VALVE WELDED WITH THE SAME ALLOY

(71) Applicants: FUKUDA METAL FOIL & POWDER CO., LTD., Kyoto-shi, Kyoto (JP); NITTAN VALVE CO., LTD., Hadano-shi, Kanagawa (JP)

(72) Inventors: Katsunori Otobe, Kyoto (JP); Shinichi Nishimura, Kyoto (JP); Kenji Nakagawa, Hadano (JP); Masanami Iio, Hadano (JP)

(73) Assignees: Fukuda Metal Foil & Powder Co., Ltd., Kyoto (JP); Nittan Valve Co., Ltd., Hadano-shi, Kanagawa (JP)

( * ) Notice: Subject to any disclaimer, the term of this patent is extended or adjusted under 35 U.S.C. 154(b) by 0 days.

(21) Appl. No.: 14/115,268

(22) PCT Filed: Oct. 15, 2012

(86) PCT No.: PCT/JP2012/076636
§ 371 (c)(1),
(2) Date: Nov. 1, 2013

(87) PCT Pub. No.: WO2013/080684
PCT Pub. Date: Jun. 6, 2013

(65) Prior Publication Data
US 2015/0152529 A1     Jun. 4, 2015

(30) Foreign Application Priority Data
Nov. 28, 2011   (JP) .................................. 2011-258396

(51) Int. Cl.
*B32B 15/01*     (2006.01)
*C22C 38/44*     (2006.01)
(Continued)

(52) U.S. Cl.
CPC . *C22C 38/44* (2013.01); *B22F 7/08* (2013.01); *B22F 9/082* (2013.01); *B23K 9/04* (2013.01);
(Continued)

(58) Field of Classification Search
CPC ........ C22C 30/02; C22C 30/04; C22C 21/06; C22C 19/05; C22C 19/07; C22C 27/04; C22C 38/44; C22C 38/42; C22C 27/06; C22C 19/056; C22C 38/57; C22C 38/54; C22C 38/52; C22C 19/053; C23C 4/06; C23C 4/08; C23C 4/085; C23C 30/00; C23C 30/005; C23C 4/04; Y10T 428/12931; Y10T 428/12937; Y10T 428/12944; Y10T 428/12951; Y10T 428/12979; Y10T 428/1284; Y10T 428/12854; Y10T 428/12778; B32B 2255/205; B32B 15/013
See application file for complete search history.

(56) References Cited

U.S. PATENT DOCUMENTS 5,431,136 A    7/1995  Kenmoku et al.
6,248,292 B1   6/2001  Ando et al.
(Continued)

FOREIGN PATENT DOCUMENTS

CN    101623922    *   1/2010
CN    102006968 A      4/2011
(Continued)

OTHER PUBLICATIONS

Machine Translation, Chen et al., CN 101623922, Jan. 2010.*
(Continued)

*Primary Examiner* — Michael E La Villa
(74) *Attorney, Agent, or Firm* — Muncy, Geissler, Olds & Lowe, P.C.

(57) ABSTRACT

A hard-facing alloy having impact resistance, wear resistance and hot corrosion resistance and containing Fe which is a bountiful resource and inexpensive is provided. Provided are: a Ni—Fe—Cr alloy containing 0 to 20.0 mass % of Mo, 8.0 to 40.0 mass % of W, 20.0 to 40.0 mass % of a total amount of Mo and W, 20.0 to 50.0 mass % of Fe, 12.0 to 36.0 mass % of Cr and 1.0 to 2.5 mass % of B, and the remainder being Ni and unavoidable impurities; and an engine valve welded with the same alloy. The above Ni—Fe—Cr alloy can further contain 15 mass % or less of a total amount of elements selected from Co, Mn, Cu, Si and C, in such cases, 15.0 mass % or less of Co, 5.0 mass % or less of each of Mn and Cu, 2.0 mass % or less of Si and 0.5 mass % or less of C are preferred.

9 Claims, 1 Drawing Sheet

(51) Int. Cl.

| | | |
|---|---|---|
| C22C 38/54 | (2006.01) | |
| C22C 19/05 | (2006.01) | |
| C22C 27/04 | (2006.01) | |
| C22C 30/02 | (2006.01) | |
| C22C 38/52 | (2006.01) | |
| C22C 38/48 | (2006.01) | |
| C22C 38/58 | (2006.01) | |
| C22C 27/06 | (2006.01) | |
| B23K 9/04 | (2006.01) | |
| B23K 35/30 | (2006.01) | |
| C23C 4/04 | (2006.01) | |
| C23C 4/06 | (2016.01) | |
| C22C 30/00 | (2006.01) | |
| F01L 3/02 | (2006.01) | |
| F01L 3/04 | (2006.01) | |
| C22C 19/07 | (2006.01) | |
| B22F 7/08 | (2006.01) | |
| B22F 9/08 | (2006.01) | |
| C22C 38/42 | (2006.01) | |
| C22C 30/04 | (2006.01) | |

(52) U.S. Cl.
CPC ............. *B23K 35/30* (2013.01); *B23K 35/3033* (2013.01); *B23K 35/3053* (2013.01); *B23K 35/3093* (2013.01); *B32B 15/013* (2013.01); *C22C 19/05* (2013.01); *C22C 19/053* (2013.01); *C22C 19/056* (2013.01); *C22C 19/07* (2013.01); *C22C 27/04* (2013.01); *C22C 27/06* (2013.01); *C22C 30/00* (2013.01); *C22C 30/02* (2013.01); *C22C 38/42* (2013.01); *C22C 38/52* (2013.01); *C22C 38/54* (2013.01); *C22C 38/58* (2013.01); *C23C 4/04* (2013.01); *C23C 4/06* (2013.01); *F01L 3/02* (2013.01); *F01L 3/04* (2013.01); *B32B 2255/205* (2013.01); *C22C 30/04* (2013.01); *Y10T 428/1284* (2015.01); *Y10T 428/12778* (2015.01); *Y10T 428/12854* (2015.01); *Y10T 428/12931* (2015.01); *Y10T 428/12944* (2015.01); *Y10T 428/12951* (2015.01); *Y10T 428/12979* (2015.01)

(56) References Cited

U.S. PATENT DOCUMENTS

| | | |
|---|---|---|
| 2001/0012491 A1* | 8/2001 | Strietzel .................. 420/452 |
| 2008/0001115 A1 | 1/2008 | Qiao et al. |
| 2011/0020166 A1 | 1/2011 | Otobe et al. |

FOREIGN PATENT DOCUMENTS

| | | |
|---|---|---|
| JP | S38-21855 B1 | 10/1963 |
| JP | S 59-9147 A | 1/1984 |
| JP | S 59-74266 A | 4/1984 |
| JP | S63-297542 A | 12/1988 |
| JP | H02-92494 | 4/1990 |
| JP | H06-38998 B2 | 5/1994 |
| JP | H06-155074 | 6/1994 |
| JP | H06-190588 | 7/1994 |
| JP | H06-297188 A | 10/1994 |
| JP | H 07-90437 A | 4/1995 |
| JP | H11-226778 | 8/1999 |
| JP | H11-310854 A | 11/1999 |
| JP | 3196381 B2 | 8/2001 |
| JP | 3196389 B2 | 8/2001 |
| JP | 3328753 B2 | 9/2002 |
| JP | 3343576 B2 | 11/2002 |
| JP | 2003-136279 | 5/2003 |
| JP | 2004-255429 A | 9/2004 |
| JP | 3855257 B2 | 12/2006 |

OTHER PUBLICATIONS

Japanese Office Action for Japanese Application No. 2013-547058 dated Jun. 4, 2014 with English translation.
Second Chinese Office Action for Chinese Application No. 201280010981.7 dated Apr. 7, 2015—English translation.
Extended European Search Report for European Application No. 12854096.0 dated Dec. 22, 2015.

* cited by examiner

NI—FE—CR ALLOY AND ENGINE VALVE WELDED WITH THE SAME ALLOY

This application is a national stage of International Application No.: PCT/JP2012/076636, which was filed on Oct. 15, 2012, and which claims priority to JP2011-258396, which was filed on Nov. 28, 2011, and which are both herein incorporated by reference.

TECHNICAL FIELD

The present invention relates to a hard-facing alloy used in various construction processes such as PTA welding, TIG welding, and thermal spraying, and more particularly to a Ni—Fe—Cr alloy having wear resistance, impact resistance and hot corrosion resistance and to an engine valve welded with the same alloy.

BACKGROUND ART

Conventionally, in an engine valve that demands wear resistance, Co-based hard-facing alloys such as Co—Cr—W—C alloy represented by Stellite (registered trademark) and Co—Mo—Si alloy represented by Tribaloy (registered trademark) are widely used, and in some engine valves, Ni-based hard-facing alloys (Patent documents 1 to 3) and Fe-based hard-facing alloys (Patent documents 4 to 8) are applied or examined.

The Co—Cr—W—C alloy has an insufficient wear resistance though having a high impact resistance as a hard-facing alloy, so that the alloy cannot withstand use for a long period of time. Also, the Co—Mo—Si alloy has an insufficient impact resistance though having a high wear resistance as a hard-facing alloy, so that problems such as cracks and exfoliation accompanied thereby are raised. Further, the Co—Cr—W—C alloy and the Co—Mo—Si alloy are made up of Co and Cr, W or Mo, therefore, the content of rare metals cannot be controlled so as to lower.

On the one hand, Ni-or Fe-based hard-facing materials having properties equivalent to the Co—Cr—W—C alloy and the Co—Mo—Si alloy have been developed and used (Patent documents 1 to 8), however, in the engine valve which is used under increasingly harsh environment, there is a problem that all of wear resistance, impact resistance and hot corrosion resistance cannot be satisfied.

PRIOR ART DOCUMENTS

Patent Documents

Patent Document 1: Japanese Patent No. 3196381
Patent Document 2: Japanese Patent No. 3196389
Patent Document 3: Japanese Patent No. 3855257
Patent Document 4: JP-A-H11-310854
Patent Document 5: JP-A-H06-297188
Patent Document 6: Japanese Patent No. 3328753
Patent Document 7: Japanese Patent No. 3343576
Patent Document 8: JP-B-H06-038998

DISCLOSURE OF THE INVENTION

Problems to be Solved by the Invention

Hard-facing alloy aiming at providing wear resistance, impact resistance or hot corrosion resistance is currently used widely in various fields of industry. However, due to an improvement in recent years in the consciousness to the environment, there is an increasing severity in the environment for use of industrial apparatus. In accompaniment therewith, a hard-facing alloy is requested to have a higher performance, and in addition, an inexpensive alloy in which the amount of rare metal used is held down is required in connection with the effective utilization of mineral resource. In particular, in a welding alloy used in an engine valve, the objective is to develop an inexpensive alloy which has excellent impact resistance, wear resistance and hot corrosion resistance and in which bountiful resources are used.

Means for Solving the Problems

In the present invention, in a study of an alloy composition for developing a hard-facing alloy which has an impact resistance, wear resistance and hot corrosion resistance and in which the content of rare metals is controlled so as to lower and resource-rich Fe is contained, the following target values have been set, and the conditions have been set to satisfy all of these.

(Target Value)
(1) Charpy impact value→4 J/cm$^2$ or more
(2) Rockwell hardness (C scale)→42 or more
(3) Wear loss→150 μm or less
(4) Fe content→20 mass % or more Here, the rare metals defined above are metals other than iron, aluminum, copper, zinc, tin, gold, silver, mercury, lead, silicon and carbon, and the metal elements corresponding to the present invention are Ni, Cr, B, Mo, W, Mn and Co.

In other words, a Ni—Fe—Cr alloy of the present invention that satisfies the above targets (1) to (4) (referred to as "alloy of the present invention" hereinafter) contains 0 to 20.0 mass % of Mo, 8.0 to 40.0 mass % of W, 20.0 to 40.0 mass % of a total amount of Mo and W, 20.0 to 50.0 mass % of Fe, 12.0 to 36.0 mass % of Cr and 1.0 to 2.5 mass % of B, and the remainder being Ni and unavoidable impurities. Here, the unavoidable impurities are impurities that are mingled unavoidably in the steps of producing each material and the like, though not intentionally added. Such impurities include, for example, Mg, S, O, N, V, Zr, Sn, and the like. The total amount of these is usually 0.3 mass % or less, and such amount does not affect the function of the present invention.

Also, the alloy of the present invention is the above-described Ni—Fe—Cr alloy containing 15 mass % or less of a total amount of elements selected from Co, Mn, Cu, Si and C, 15.0 mass % or less of Co, 5.0 mass % or less of each of Mn and Cu, 2.0 mass % or less of Si, and 0.5 mass % or less of C.

Also, the engine valve of the present invention is characterized by that the alloy of the present invention having the aforesaid composition is welded or coated. A more preferable engine valve is such that at least a valve seat surface coming into contact with seat insert is welded or coated with the aforesaid alloy of the present invention.

Next, the reason why the range of each component of the alloy of the present invention is limited will be described.

W and Mo impart wear resistance and impact resistance by being soluted into a Ni or Fe solid solution which forms as a substrate (matrix), and a part thereof forms an intermetallic compound with B, thereby further contributing to improvement in the wear resistance. However, when the total amount of W and Mo is less than 20.0 mass %, the crystallization of the intermetallic compound is insufficient, and when the total amount exceeds 40.0 mass %, the intermetallic compound is formed in a large amount, thereby greatly lowering the toughness (impact resistance). For this reason, the total amount of Mo and W has been set to be within the range of 20.0 to 40.0 mass %. In addition, when the content of W is less than 8.0 mass %, the crystallization of the intermetallic compound is insufficient, therefore, the content of W is preferred within the range of 8.0 to 40.0 mass %. The solid solution limit amount of Mo to the substrate is smaller than that of W, therefore, the upper limit of the content of Mo has been set to be 20.0 mass %. Further, the content of Mo can be 0 mass % since Mo is an arbitrary component.

Fe is a resource-rich and inexpensive element and contributes price-reduction of the product. Accordingly, it is preferable that the content of Fe is as much as possible, and its lower limit has been set to be 20 mass %. On the one hand, Fe dissolves into Ni solid solution, however, when the content exceeds 50 mass %, the impact value, hardness and hot corrosion resistance lower. Therefore, the content of Fe has been set to be within the range of 20.0 to 50.0 mass %.

Cr imparts wear resistance, impact resistance, corrosion resistance, and oxidation resistance by being dissolved into a Ni or Fe solid solution. Also, a part of Cr forms an intermetallic compound with B so as to be dispersed in the matrix, thereby further contributing to improvement in the wear resistance. However, when the content is less than 12.0 mass %, sufficient wear resistance, corrosion resistance, and oxidation resistance cannot be obtained. When the content exceeds 36.0 mass %, the intermetallic compound is formed in a large amount in the metallographic structure, thereby greatly lowering the toughness. Therefore, the content of Cr has been set to be within the range of 12.0 to 36.0 mass %.

B imparts wear resistance by forming an intermetallic compound with W, Mo or Cr, and cleans the molten metal to improve the fluidity at the time of welded, thereby improving the construction workability in PTA welding, TIG welding, thermal spraying or the like. However, when the content is less than 1.0 mass %, a sufficient amount of intermetallic compound is not formed, so that the wear resistance is lowered, and moreover, the function of cleaning the molten pool becomes insufficient. Further, when the content exceeds 2.5 mass %, the intermetallic compound is large in amount, thereby greatly lowering the toughness (impact resistance). For this reason, the content of B has been set to be within the range of 1.0 to 2.5 mass %.

The alloy of the present invention can further contain 15.0 mass % or less of Co, 5.0 mass % or less of each of Mn and Cu, 2.0 mass % or less of Si, and 0.5 mass % or less of C as added elements that do not give adverse effects on the physical properties. However, in order not to deteriorate the impact resistance and wear resistance, the upper limit value of the total amount of Co, Mn, Cu, Si and C has been set to be 15.0 mass % or less.

Effect of the Invention

The alloy of the present invention is an alloy in which the amount of rare metals used is reduced by containing Fe of 20 mass % or more, and has the characteristics of a Charpy impact value of 4 J/cm$^2$ or more and a Rockwell hardness (HRC) of 42 or more. Further, in the valve-seat insert wear test mentioned below, total quantity reduced by abrasion of an engine valve and a seat insert is less than 150 μm, so that this alloy can be applied to a wide range of use as a hard-facing alloy having impact resistance and wear resistance, except for an engine valve.

MODE FOR CARRYING OUT THE INVENTION

The alloy of the present invention can be obtained by heating and melting an ingot, in which Ni as a base, W, Mo, Fe, Cr and B as added components, and Co, Mn, Cu, C and Si added in accordance with the needs are each adjusted and blended to have a predetermined mass %, in a crucible within a melting furnace so as to form an alloy in a molten metal, and thereafter transforming the molten alloy into a powder by the atomizing method or the melt-crushing method or casting in a predetermined mold to form a rod shape or a plate shape.

In particular, the alloy of the present invention produced by the atomization method can be applied to surface modification such as PTA welding or thermal spraying by being adjusted to have a particle size suitable for the intended construction method, and the welding rod produced by the continuous casting method can be applied to surface modification such as gas welding. Also, by constructing this powder or rod material on a seat surface of an engine valve having various material properties, a wear resistance can be imparted to the engine valve.

EXAMPLES

The alloys of the Examples of the present invention prepared and blended in the above-described method and the alloys of the Comparative Examples were melted and subjected to the measurement of the Charpy impact value and the Rockwell hardness and to the wear test by the methods described below.

(1) Charpy Impact Test;

By using an electric furnace, 100 g of an ingot having a blending composition of each alloy was heated to about 1600° C. and melted in an atmosphere of argon gas, and was cast into a shell mold to be mechanically processed into a test piece (without a notch) described in JIS Z 2242:2005. Then, by using a Charpy impact tester, an impact test was carried out in accordance with JIS Z 2242:2005, so as to measure the impact value.

(2) Rockwell Hardness Measurement;

A cast piece melted by the same method as described in the above (1) was mechanically processed into a shape of 10×10× 20 mm to expose a parallel surface, and the top part of the parallel surface was subjected to wet polishing with a water-resistant abrasive paper of #240, so as to carry out a Rockwell hardness test in accordance with JIS Z 2245:2005. Here, the measurement of hardness was carried out in C scale.

Figure 1:
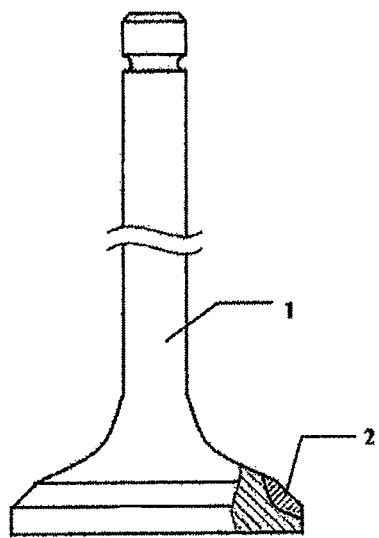
FIG. 1 is a schematic view in one example of an engine valve welded with the alloy of the present invention.
Figure 2:
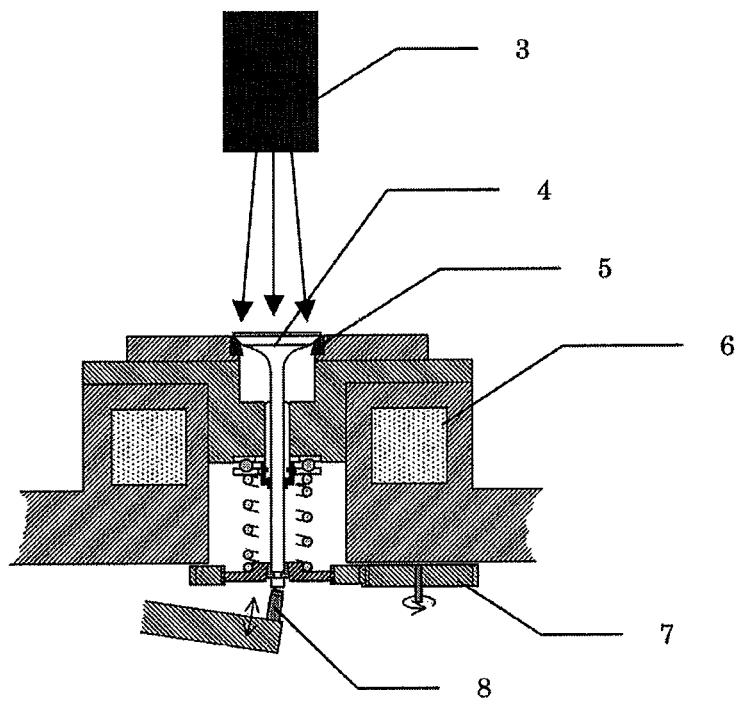
FIG. 2 is a schematic view showing a method of valve-seat insert wear test.

(3) Wear Test;

By using a high-frequency melting furnace, 100 kg of an ingot having a mixing composition of each alloy was heated to about 1600° C. and melted in a stream of argon, and was powdered by the gas atomization method, so as to adjust the particle size to 80 to 350 mesh by a vibration sieve. This alloy powder was subjected to PTA welding on a seat surface (the part shown by the reference sign 2 in FIG. 1) of an engine valve (head diameter of about 32 mm, stem diameter of about 6 mm, and an overall length of about 110 mm) fabricated by using a Fe—Ni—Cr heat-resistant steel, and mechanically processed into a predetermined shape, and then, the valve-seat insert wear test was carried out by using the test method shown in FIG. 2. Here, Co—Mo—Cr sintered material was used as a seat insert material, the test was carried out under the condition of cam rotation number of 3000 rpm, valve rotation number of 20 rpm, valve face temperature of 250 to 400° C., test time of 9 hours, and then the total quantity reduced by wear of the valve and the valve seat insert before and after the test was calculated.

(Evaluation Standard)

○: Total wear loss of the valve and the seat insert is less than 100 μm

Δ: Total wear loss of the valve and the seat insert is 100 μm or more, but less than 150 μm x: Total wear loss of the valve and the seat insert is 150 μm or more Table 1 shows the Examples of the present invention, and Table 2 and Table 3 show the Comparative Examples.

TABLE 1

| Example No. | Component (mass %) | | | | | | | Impact value (J/cm$^2$) | Hardness (HRC) | Wear loss |
|---|---|---|---|---|---|---|---|---|---|---|
| | Ni | W | Mo | Fe | Cr | B | Others | | | |
| 1 | 15.3 | 30 | — | 30 | 23 | 1.5 | 0.2Si | 5 | 45.8 | ○ |
| 2 | 27.9 | 10 | 12 | 28 | 20 | 2.1 | — | 4 | 46.4 | Δ |
| 3 | 13.9 | 22 | — | 28 | 34 | 1.6 | 0.5Si | 4 | 49.1 | Δ |
| 4 | 21.5 | 39 | — | 22 | 16 | 1.5 | — | 6 | 45.5 | ○ |
| 5 | 17.3 | 20 | 18 | 25 | 18 | 1.7 | — | 4 | 44.5 | ○ |
| 6 | 10.4 | 25 | — | 48 | 15 | 1.6 | — | 5 | 43.3 | Δ |
| 7 | 10.7 | 33 | — | 27 | 14 | 2.3 | 13Co | 4 | 42.5 | ○ |
| 8 | 10.4 | 25 | — | 35 | 28 | 1.2 | 0.4C | 8 | 43.4 | Δ |
| 9 | 17.5 | 25 | 5 | 28 | 23 | 1.5 | — | 6 | 44.5 | ○ |
| 10 | 30.9 | 10 | 15 | 25 | 16 | 1.3 | 1.8Si | 5 | 44.2 | Δ |
| 11 | 18.3 | 20 | 10 | 25 | 25 | 1.4 | 0.3C | 7 | 43.2 | ○ |
| 12 | 20.9 | 15 | 8 | 26 | 15 | 1.3 | 10Co, 3Mn, 0.8Si | 7 | 43.3 | Δ |

TABLE 2

| Comp. Ex. No. | Component (mass %) | | | | | | | Impact value (J/cm$^2$) | Hardness (HRC) | Wear loss |
|---|---|---|---|---|---|---|---|---|---|---|
| | Ni | W | Mo | Fe | Cr | B | Others | | | |
| a | 28.7 | 15 | 3 | 35 | 16 | 1.8 | 0.5Si | 7 | 38.6 | X |
| b | 12.3 | 42 | — | 25 | 18 | 2.7 | — | 3 | 48.9 | ○ |
| c | 23.4 | 10 | 22 | 25 | 16 | 1.3 | 2.3Si | 3 | 42.4 | ○ |
| d | 11.8 | 24 | 18 | 30 | 15 | 1.2 | — | 3 | 52.4 | ○ |
| e | 44.2 | 26 | — | 18 | 10 | 1.5 | 0.3C | 10 | 35.6 | X |
| f | 1.6 | 25 | 5 | 52 | 15 | 1.4 | — | 3 | 40.4 | Δ |
| g | 11.2 | 25 | — | 25 | 38 | 0.8 | — | 9 | 41.6 | X |
| h | 9.7 | 20 | 10 | 35 | 23 | 1.6 | 0.7C | 2 | 46.7 | ○ |
| i | 21.0 | 12 | 12 | 25 | 12 | 1.0 | 15Co, 2Mn | 6 | 40.1 | X |

TABLE 3

| Comp. Ex. No. | Component (mass %) | Fe content (mass %) | Impact value (J/cm$^2$) | Hardness (HRC) | Wear loss |
|---|---|---|---|---|---|
| A | Co—28.5Cr—4.6W—1.2C | 0 | 14 | 43.3 | X |
| B | Co—30Cr—8.5W—1.45C | 0 | 6 | 48.4 | X |
| C | Co—29Mo—8.5Cr—2.8Si | 0 | 3 | 55.2 | ○ |
| D | Co—22Mo—17Cr—1.3Si—0.2C | 0 | 4 | 49.2 | ○ |
| E | Ni—30.2Cr—9.07Mo—3.7Si—2.61C | 0 | 3 | 40.8 | ○ |
| F | Ni—32.4Cr—9.09Mo—3.65C—2.01Si | 0 | 3 | 42.1 | ○ |
| G | Ni—32.2Cr—15Mo—2.68C—1.01Si | 0 | 3 | 46.3 | Δ |
| H | Ni—37Cr—20Co—16Fe—10Nb—1Si—0.05C | 16.0 | 1 | 55.4 | ○ |
| I | Ni—22Cr—16Fe—13Mo—6Nb—1Si—0.05C | 16.0 | 7 | 31.2 | X |
| J | Fe—45Mo—20Ni—12Mn—0.9C | 22.1 | 1 | 45.0 | ○ |
| K | Fe—21Mo—20Ni—12Mn—1.2C | 45.8 | 5 | 39.6 | Δ |
| L | Fe—33Mo—28Co—10Ni—5Mn—4Cr—1.5Si—0.3C | 18.2 | 2 | 48.1 | ○ |
| M | Fe—22.6Ni—23.4Mo—14.6Mo—2.15C—0.58Si—0.55Mn—0.3Co | 35.82 | 3 | 46.3 | X |
| N | Fe—24.5Ni—33.1Cr—5.3Mo—2.21C—10.49Mn—1Co—0.3W | 23.1 | 3 | 37.9 | X |
| O | Fe—22.7Ni—31Cr—11.8Co—11Mo—7.9W—1.29C—0.19Si—0.97Mn—0.015B | 13.135 | 2 | 48.0 | ○ |
| P | Fe—20Cr—20Ni—12Mn—8Mo—1.3C—0.2Si | 38.5 | 4 | 32.9 | X |
| Q | Fe—22Cr—21Ni—12Mn—10Mo—2C—0.2Si | 32.8 | 4 | 40.4 | X |
| R | Fe—35Cr—4Si—1C—3B | 57.0 | 2 | 55.3 | ○ |
| S | Fe—32Cr—12Ni—2.3Mn—6.2Si—1.5C | 46.0 | 1 | 58.0 | ○ |
| T | Fe—20Ni—20Cr—10Mo—12Mn—1.8C—0.2Si—0.02Al—0.005B | 35.975 | 8 | 34.5 | X |
| U | Fe—25Cr—15Ni—5Mn—5Mo—1.5C—0.8Si—0.08Al—0.08B | 47.54 | 9 | 29.7 | X |

The alloys (a) to (i) of the Comparative Examples shown in Table 2 are alloys having a composition outside of the scope of the claims of the present invention. In the alloy (a), the sum of Mo and W is below the lower limit of the claims; in the alloy (e), each of Fe and Cr is below the lower limit of the claims; in the alloy (g), Cr exceeds the upper limit of the claims and B is below the lower limit of the claims; and in the alloy (i), the sum of Co and Mn exceeds the upper limit of the claims. In any of these cases, the hardness and the wear loss do not satisfy the target value. In the alloy (b), each of W and B exceeds the upper limit of the claims; in the alloy (c), each of Mo and Si exceeds the upper limit of the claims; in the alloy (d), the sum of W and Mo exceeds the upper limit of the claims; and in the alloy (h), C exceeds the upper limit of the claims. In any of these cases, the impact value does not satisfy the target value. In the alloy (f), Fe exceeds the upper limit of the claims, and the impact value and the hardness do not satisfy the target value.

The alloys (A) to (U) of the Comparative Examples shown in Table 3 are conventional Co—Cr—W—C type alloys (Stellite (registered trademark)), Co—Mo—Si type alloys (Tribaloy (registered trademark)), or alloys having a composition shown in other patent documents; however, any of these alloys does not satisfy the target value of at least one of Fe content, the impact value, the hardness and the wear loss.

On the other hand, as shown in Table 1, the Examples 1 to 12 which are the alloys of the present invention satisfy the target values of all of the impact value, the hardness and the wear loss, and have a suitable wear resistance and sufficient toughness as a hard-facing alloy.

(4) PTA Welding Test;

The flowing characteristic of the molten pool formed at the time of overlay welding in the fabrication of the engine valve in the wear test described in the above (3) was examined. Consequently, it was confirmed that all of the flowing characteristic of the alloys of the Examples was very good and the overlay welding workability was excellent.

(5) Hot Corrosion Sulfidation Resistance;

Each of the engine valves fabricated by the same method as described in the above (3) using the alloy compositions of the alloys of the Examples and the alloys (A) and (C) of the Comparative Examples was wrapped with sodium sulfide and maintained at 850° C. for 2 hours, and then the state of the surface of the welding layer was confirmed. Consequently, in the alloy (C) of the Comparative Example the formation of sulfide was confirmed, however, in the alloys of the Examples and the alloy (A) of the Comparative Example, the formation of sulfide was not confirmed and these alloys had an excellent hot corrosion resistance by sulfide.

(7) Heat Shock Test;

Each of the engine valves fabricated by the same method as described in the above (3) using the alloy compositions of the alloys of the Examples and the alloys (A) and (C) of the Comparative Examples was heat treated for one hour in an electric furnace set at 400° C., and thereafter put into water of about 20° C. for quick quenching. Subsequently, the heat treatment temperature is further raised by 50° C., so as to perform a heat treatment for one hour and quenching with water. This is repeated until the heat treatment temperature becomes 650° C., and whether cracks or exfoliation was generated or not in the welding layer by the water quenching after the heat treatment at 650° C. was examined. Consequently, in the alloy (C) of the Comparative Example, cracks ware observed, however, in the alloys of the Examples and the alloy (A) of the Comparative Example, cracks were not observed and it was confirmed that all of these had a sufficient thermal shock property.

INDUSTRIAL APPLICABILITY

As described above, the alloy of the present invention has excellent wear resistance and impact resistance properties as a hard-facing alloy, therefore, in the engine valve welded with the same, the improvement of durability can be expected. Further, since the alloy of the present invention contains 20 mass % or more of Fe which is resource-rich and relatively inexpensive, the amount of rare metal used can be controlled so as to lower, and it is possible to fabricate an engine valve thoughtful of an effective utilization of mineral resource or an environment.

Also, the alloy of the present invention is not limited to usage for welding, so that, by compositely adding this into a sintered component formed by powder metallurgy to form hard particles, this alloy can be utilized also for forming a mechanical component having good wear resistance.

DESCRIPTION OF REFERENCE SIGNS 1 engine valve
2 seat surface (welding layer): surface coming into contact with the seat insert
3 heating burner
4 valve
5 seat insert
6 cooling water
7 rotator (rotate in the direction of radius)
8 pushrod (vertical motion)

The invention claimed is:

1. An engine valve welded or coated with a Ni—Fe—Cr alloy consisting of 0 to 20.0 mass % of Mo, 8.0 to 40.0 mass % of W, 20.0 to 40.0 mass % of a total amount of Mo and W, 20.0 to 50.0 mass % of Fe, 12.0 to 36.0 mass % of Cr, 1.0 to 2.5 mass % of B, 10.4 mass % or more of Ni, and unavoidable impurities.

2. The engine valve according to claim 1, wherein at least a seat surface coming into contact with a seat insert is welded or coated with said Ni—Fe—Cr alloy.

3. An engine valve welded or coated with a Ni—Fe—Cr alloy consisting of 0 to 20.0 mass % of Mo, 8.0 to 40.0 mass % of W, 20.0 to 40.0 mass % of a total amount of Mo and W, 20.0 to 50.0 mass % of Fe, 12.0 to 36.0 mass % of Cr, 1.0 to 2.5 mass % of B, at least one element selected from Co, Mn, Si and C, 10.4 mass % or more of Ni, and unavoidable impurities, wherein a total amount of Co, Mn, Si and C is 15 mass % or less, the content of Co is 15.0 mass % or less, the content of Mn is 5.0 mass % or less, the content of Si is 2.0 mass % or less, and the content of C is 0.5 mass % or less.

4. The engine valve according to claim 3, wherein at least a seat surface coming into contact with a seat insert is welded or coated with said Ni—Fe—Cr alloy.

5. An engine valve welded or coated with a Ni—Fe—Cr alloy consisting of 22.0 to 40.0 mass % of W, 20.0 to 50.0 mass % of Fe, 12.0 to 36.0 mass % of Cr, 1.0 to 2.5 mass % of B, 10.4 mass % or more of Ni, and unavoidable impurities.

6. The engine valve according to claim 5, wherein at least a seat surface coming into contact with a seat insert is welded or coated with said Ni—Fe—Cr alloy.

7. An engine valve welded or coated with a Ni—Fe—Cr alloy consisting of 22.0 to 40.0 mass % of W, 20.0 to 50.0 mass % of Fe, 12.0 to 36.0 mass % of Cr, 1.0 to 2.5 mass % of B, at least one element selected from Co, Mn, Si and C, 10.4 mass % or more of Ni, and unavoidable impurities, wherein a total amount of Co, Mn, Si and C is 15 mass % or less, the content of Co is 15.0 mass % or less, the content of Mn is 5.0 mass % or less, the content of Si is 2.0 mass % or less, and the content of C is 0.5 mass % or less.

8. The engine valve according to claim 7, wherein at least a seat surface coming into contact with a seat insert is welded or coated with said Ni—Fe—Cr alloy.

9. A Ni—Fe—Cr alloy consisting of 22.0 to 40.0 mass % of W, 20.0 to 50.0 mass % of Fe, 12.0 to 36.0 mass % of Cr, 1.0 to 2.5 mass % of B, 10.4 mass % or more of Ni, and unavoidable impurities.

* * * * *